United States Patent [19]

Chiba et al.

[11] Patent Number: 4,875,810
[45] Date of Patent: Oct. 24, 1989

[54] APPARATUS FOR CONTROLLING FINE PARTICLE FLOW

[75] Inventors: Yuji Chiba, Atsugi; Kenji Ando, Kawasaki; Masao Sugata, Yokohama; Hiroyuki Sugata, Atsugi; Toshiaki Kimura, Sagamihara; Kuniji Osabe, Tama, all of Japan

[73] Assignee: Canon Kabushiki Kaisha, Tokyo, Japan

[21] Appl. No.: 325,021

[22] Filed: Mar. 20, 1989

Related U.S. Application Data

[63] Continuation of Ser. No. 920,437, Oct. 29, 1986, abandoned.

[30] Foreign Application Priority Data

Oct. 21, 1985 [JP] Japan ................................ 60-233561
Oct. 21, 1985 [JP] Japan ................................ 60-233562

[51] Int. Cl.$^4$ .............................................. C23C 13/08
[52] U.S. Cl. ...................................... 406/14; 118/692; 219/121.12
[58] Field of Search ................ 406/14, 194; 219/76.1, 219/121.11, 121.12; 239/63; 118/50, 308, 663, 692, 710; 204/298, 192, 13; 250/21, 492

[56] References Cited

U.S. PATENT DOCUMENTS

| 3,010,009 | 11/1961 | Ducati | 219/121 PL |
| 3,075,065 | 1/1963 | Ducati et al. | 219/121 PP |
| 3,839,618 | 10/1974 | Muehlberger | 219/121 PL |
| 4,006,340 | 2/1977 | Corinas | 219/121 PL |
| 4,466,380 | 8/1984 | Jansen et al. | 118/692 X |
| 4,582,731 | 4/1986 | Smith | 118/308 X |

FOREIGN PATENT DOCUMENTS

| 194424 | 11/1984 | Japan | 118/692 |
| 2144888 | 3/1985 | United Kingdom | 204/192.13 |

Primary Examiner—Sherman D. Basinger
Assistant Examiner—Stephen P. Avila
Attorney, Agent, or Firm—Fitzpatrick, Cella, Harper & Scinto

[57] ABSTRACT

An apparatus for controlling a flow of fine particles including a convergent-divergent nozzle in the flow path of the fine particles, and a controller for controlling the discharge of gas from a downstream chamber to maintain the pressures at the nozzle outlet and in the downstream chamber approximately equal to each other.

12 Claims, 4 Drawing Sheets

APPARATUS FOR CONTROLLING FINE PARTICLE FLOW

This application is a continuation of application Ser. No. 920,437 filed Oct. 20, 1986 now abandoned.

BACKGROUND OF THE INVENTION

1. Field of the Invention

This invention relates to an apparatus for controlling a flow of fine particles which is utilized by transferring means or blowing means of fine particles and is expected to be useful for film forming working, formation of a composite material, and dope working with fine particles, and the new field for formation of fine particles.

In the present specification, fine particles refer to atoms, molecules, ultra-fine particles and usual fine particles. Here, ultra-fine particles refer to ultra-minute particles (generally 0.5 $\mu m$ or less) obtained by, for example, vaporization in gas plasma vaporization, a gas phase chemical reaction, the colloidal precipitation method, the solution spraying pyrolysis method, utilizing a liquid phase reaction, etc. The usual fine particles refers to minute particles obtained by the general methods such as mechanical pulverization, precipitating treatment, etc. A beam in the present specification refers to a jet stream flowing in a certain direction with directivity with a higher density than the surrounding space, regardless of its sectional. shape.

2. Related Background Art

Generally speaking, fine particles can be dispersed and suspendedin a carrier gas, and delivered through the flow of the carrier gas.

In the prior art, the flow control of fine particles for delivery of the above fine particles has been performed only by partitioning the whole pathway of the fine particles flowing together with the carrier gas through the pressure difference between the upstream side and the downstream side with a pipe or a casing. Accordingly, the flow of fine particles will necessarily spread independently of the flow velocity within a whole pipe or casing which partitions the pathway of fine particles.

Also, when fine particles are blown against a substrate, etc., it has been practiced to jet out fine particles together with a carrier gas through a nozzle. The nozzles used for blowing of fine particles are simple parallel pipes or a nozzle convergent toward its end tip, and surely the sectional area of the jet stream of the fine particles immediately after jetting is narrowed corresponding to the area of the end of the nozzle. However, since the jet stream is diffused at the outlet surface of the nozzle, it is no more than that obtained by narrowing temporarily the pathway, and the velocity of the jet stream will never surpass acoustic velocity.

Whereas, by partitioning the whole pathway of fine particles with a pipe or a casing and delivering fine particles together with a carrier gas along the pathway through the pressure difference between the upstream side and the downstream side, it is impossible to obtain a high delivering speed. Also, it is difficult to avoid contact between the wall surfaces of the pipe or the casing partitioning the pathway of fine particles with fine particles over the whole delivering section. For this reason, and particularly in transporting active fine particles to their capturing position, such a method has the disadvantage that activity is liable to be lost with the lapse of time or through contact with the wall surface of the pipe or the casing. Also, if the whole pathway of the fine particles is patitioned with pipe material or casing members, due to the generation of dead space in the flow, etc., the capturing percentage of the fine particles delivered may be lowered or utilization efficiency of the carrier gas for the delivery of fine particles may be lowered.

On the other hand, a set of parallel tubes or a nozzle converging toward the end tip of prior art devices will produce a diffused stream with a broad density distribution of fine particles in the jet stream after passing through. Therefore, therethrough the problem arises that uniform blowing control is difficult to achieve in the case of blowing fine particles against a substrate, etc. The control of the region of the uniform flowing is also difficult to achieve.

SUMMARY OF THE INVENTION

An object of the present invention is to provide a flow controlling apparatus capable of forming a stream of fine particles having strong beam characteristic.

Another object of the present invention is to provide a flow controlling apparatus for delivering fine particles with a sufficient efficiency through a free space without use of piping materials such as pipes, etc.

Still another object of the present invention is to provide a flow controlling apparatus for delivering activated fine particles without deactivation through mutual contact.

According to an aspect of the present invention, there is provided an apparatus for controlling a flow of fine particles, comprising a convergent-divergent nozzle in a flow path of the fine particles, and a controller for controlling the discharge of gas from a downstream chamber to maintain the pressures at the nozzle outlet and in the downstream chamber approximately equal to each other.

According to another aspect of the present invention, there is provided an apparatus for controlling a flow of fine particles, comprising a convergent-divergent nozzle in a flow path of fine particles, and a controller for controlling the feed of gas and for maintaining the pressures at the outlet of the nozzle and in the downstream chamber approximately equal to each other.

According to a furhter aspect of the present invention, there is provided an apparatus for controlling a flow of fine particles, comprising a convergent-divergent nozzle in the flow path of the fine particles, and a controller for controlling the feed of gas to the upstream chamber and the discharge of the gas from the downstream chamber to maintain the pressures at the outlet of the nozzle and in the downstream chambers approximately equal to each other.

DESCRIPTION OF THE DRAWINGS

FIGS. 1(*a*) and 1(*b*) are schematic illustrations of examples of the present invention;

FIG. 2 is a perspective view partially cut away showing an example of the convergent-divergent nozzle;

FIGS. 3(*a*) and 3(*b*) are each longitudinal sectional views showing another example a convergent-divergent nozzle;

FIGS. 4(*a*), 4(*b*) and 5 are each a flow chart of the controller.

DETAILED DESCRIPTION OF THE PREFERRED EMBODIMENTS

Figure 1A:
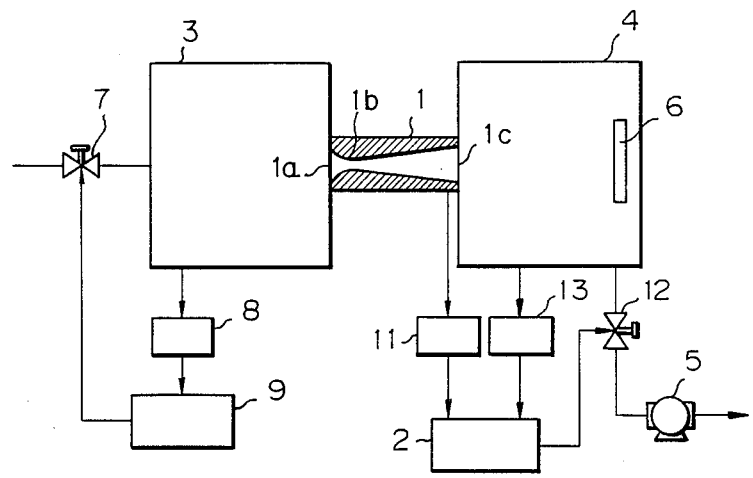

The convergent-divergent nozzle 1 in the present invention, as shown in FIG. 1, refers to a nozzle, which is gradually converged in an opening area from the flow inlet 1a toward the middle portion to form a throat portion 1b, and is gradually diverged in an opening area from the throat portion 1b toward the flow outlet 1c. In FIG. 1, for convenience of explanation, an upstream chamber 3 and a downstream chamber 4 which are illustrated each as a closed system are provided on the inflow side and the outflow side of the convergent-divergent nozzle 1. However, the inflow side and the outflow side of the convergent-divergent nozzle 1 in the present invention may be either a closed system or an open system, provided that the pressure ratio $P_2/P_1$ of the pressure $P_2$ at the downstream side to the pressure $P_1$ at the upstream side can be made less than or equal to a critical ratio of pressure.

The critical ratio of pressure as herein mentioned refers to the pressure ratio as described below.

Specifically, if the flow velocity at the throat portion 2 of the nozzle is coincident with the acoustic velocity, the flow velocity at the nozzle outlet will become ideally coincident with the Mach number M which is dependent on the ratio of the sectional area $A^*$ at the throat portion 2 to the sectional area A at the nozzle outlet. This relationship is determined specifically by the formula (2) as described below.

For such a Mach number M, the pressure ratio $P_2/P_1$ of the pressure $P_2$ in the downstream chamber 4 to the pressure $P_1$ in the upstream chamber 3 determined by the following formula is called the critical ratio of pressure; and $$\frac{P_2}{P_1} = \left(1 + \frac{\kappa - 1}{2} M^2\right)^{\frac{\kappa}{\kappa - 1}}$$

For example, as shown in FIG. 1, when the downstream chamber 4 is internally evacuated by a vacuum pump 5 with feeding of a carrier gas containing fine particles dispersed therein into the upstream chamber 3, there is created a pressure difference between the upstream chamber 3 and the downstream chamber 4. Accordingly, the carrier gas containing fine particles passes through the convergent-divergent nozzle 1 from the upstream chamber 3 to flow into the downstream chamber 4.

Here, if it is supposed that the flow passing through the convergent-divergent nozzle is adiabatically expanded within the nozzle 1 and also that the pressure ratio $P_2/P_1$ of the pressure $P_2$ on the downstream side to the pressure $P_1$ on the upstream side of the nozzle 1 is the critical ratio of pressure or lower, the velocity of the flow jetted out from the nozzle 1 becomes ultrasonic, and the Mach number M attained will be represented by the following formula. In this formula, the velocity of flow is defined as u, the acoustic velocity at that point as a and the specific heat ratio of the flow as $\gamma$.

$$M = \frac{u}{a} = \left(\left[\left(\frac{P_1}{P_2}\right)^{\frac{\gamma - 1}{\gamma}} - 1\right]\frac{2}{\gamma - 1}\right)^{\frac{1}{2}} \quad (1)$$

The acoustic velocity will be represented by the following formula with the local temperature being T and the gas constant R.

$$a = \sqrt{\gamma R T}$$

There is the following relationship between the opening area A of the flow outlet 1*c* and the opening area A* of the throat portion 1*b* and the attained Mach number M.

$$\frac{A}{A^*} = \frac{1}{M}\left[\frac{2}{\gamma + 1}\left(1 + \frac{\gamma - 1}{2} M^2\right)\right]^{\frac{\gamma + 1}{2(\gamma - 1)}} \quad (2)$$

By controlling $P_2/P_1$ so that the Mach number determined according to this formula (2) from A/A* may be equal to the Mach number M determined from the above formula (1), the flow jetted out from the convergent-divergent nozzle 1 becomes an optimum expansion flow. The optimum expansion flow is a flow which is jetted out from the convergent-divergent nozzle 1 in which the pressure $P_n$ at the flow outlet 1*c* becomes substantially equal to the pressure $P_2$ on the downstream side. On the other hand, as contrasted to the appropriate expanded flow in which $P_n = P_2$, the flow in which $P_n > P_2$ is called under-expansion flow and the flow in which $P_n < P_2$ is called over-expansion flow.

When the flow jetted out from the cionvergent-divergent nozzle 1 becomes a supersonic optimum expansion flow, the flow travels in the wall surface direction within the flow outlet 1*c*, having a substantially uniform velocity distribution in the sectional direction of the convergent-divergent nozzle into be converted to a beam. Accordingly, the fine particles delivered as the flow is converted into a beam is delivered through the space within the downstream chamber 4 with a minimum degree of diffusion under a spatially independent state without interference with the wall surface of the downstream chamber 4 and at a supersonic velocity.

Thus, by delivering active fine particles converted as such to a beam, they can be delivered as a beam at a supersonic velocity and under the spatially independent state, and for example, they can be captured by attaching them onto a substrate 6 provided in the downstream chamber 4. Accordingly, it becomes possible to capture the fine particles in a satisfactorily active state. Also, since the fine particles are blown on the substrate 6 as a beam with a substantially constant jet stream cross-section in the flow direction, the blowing region can be controlled easily.

The above formulae (1) and (2) are valid when the flow is adiabatically expanded in the convergent-divergent nozzle 1, and they are not valid when the flow in the convergent-divergent nozzle 1 is under an exothermic or an endothermic condition. Therefore, it may be sometimes difficult to always obtain the optimum expansion flow only by control of $P_2/P_1$ corresponding merely to A/A*. Accordingly, in the present invention, the gas feeding on the downstream side is controlled so that the pressure $P_n$ at the flow outlet 1*c* of the convergent-divergent nozzle 1 may be substantially equal to the pressure$P_2$ on the downstream side of the convergent-divergent nozzle 1. In other words, when $P_n$ becomes greater than $P_2$, gas feeding in the upstream side is promoted or discharge in the downstream side is suppressed to increase $P_2$ to control the pressure so that $P_n$ may be equal to $P_2$, while when $P_n$ becomes lower than $P_2$, gas feeding on the upstream side is suppressed or discharge in the downstream side is promoted to lower $P_2$, thus controlling the pressure so that $P_n$ may also become equal to $P_2$.

The above control is performed by the controller 2, whereby in spite of heat absorption or heat generation of the flow in the convergent-divergent nozzle 1 or a slight fluctuation in the pressure $P_1$ on the upstream side, sure formation of the optimum expansion flow and its maintenance can be effected. Therefore, conversion of the flow into a beam as described above can be steadily obtained.

In the following, the present invention is described by referring to the following Examples.

Figure 1B:
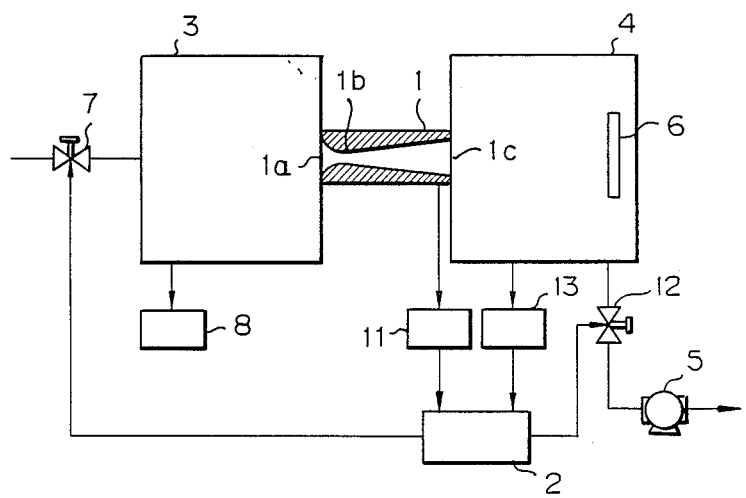

FIG. 1(a) is a diagram of a device for controlling evacuation on the downstream side, FIG. 1(b) is a diagram of a device for controlling gas feeding on the upstream side, and the upstream chamber 3 is connected to the downstream chamber 4 through a convergent-divergent nozzle 1. First, the apparatus shown in FIG. 1(a) is explained. To the upstream chamber 3, a feed valve 7 for feeding a carrier gas containing fine particles dispersed therein is connected. The pressure $P_1$ in the upstream chamber 3 is detected by a pressure gauge 8, and opening and closing of the feeding valve 7 is designed to be controlled by a controller 9 based on the pressure $P_1$.

Figure 2:
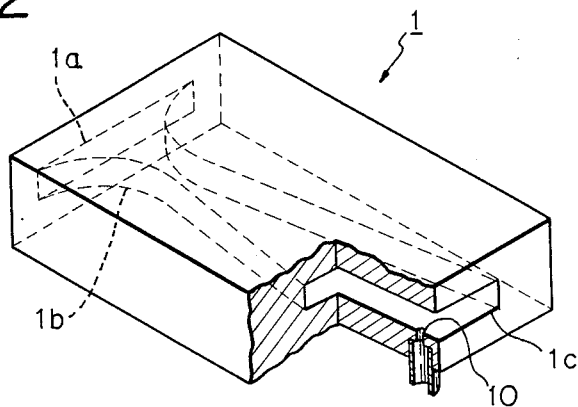

The convergent-divergent nozzle 1 has a static pressure hole 10 formed in proximity to the flow outlet 1c as shown in FIG. 2, and the pressure $P_n$ at the flow outlet 1c is designed to be detected by a pressure gauge 11 through the static pressure hole 10. The static pressure hole 10 should be made as small in diameter as possible without the protrusion of a burr on the internal surface so that no disturbance of the flow within the convergent-divergent nozzle 1 is caused to occur. Also, the static pressure hole 10 should preferably be formed sufficiently close to the flow outlet 1c so that the pressure at the flow outlet 1c can be detected as correctly as possible.

The static pressure hole 10 may be opened at the inside surface of nozzle 1, slanting relative to its center axis, but it should preferably be opened on the surface parallel to the center axis as shown in FIG. 2 for the purpose of minimizing the distance to the flow in the convergent-divergent nozzle 1. For the same reason, the convergent-divergent nozzle 1 should preferably have a rectangular cross-section as shown in FIG. 2 rather than a circular cross-section, because it can easily be formed to have an inside surface parallel to the center axis.

Figure 3A:
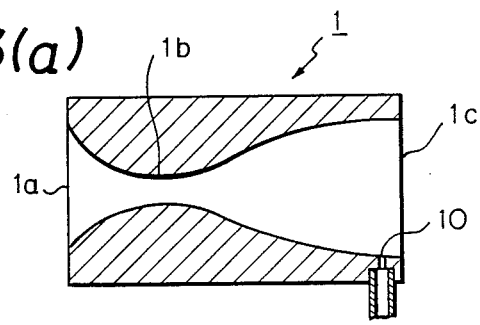
Figure 3B:
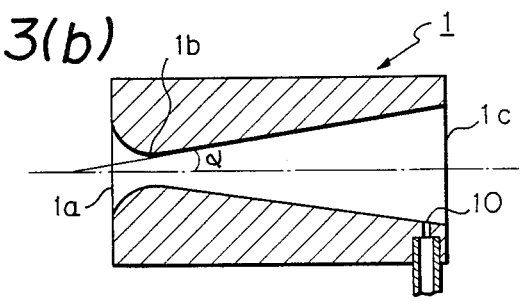

The convergent-divergent nozzle 1 may be one in which the opening area is gradually narrowed from the flow inlet to give a throat portion 1b and in which the opening area is then gradually enlarged to give a flow outlet 1c, as described above, but it is preferred that the inside circumferential surface near the flow outlet 1c should be substantially parallel to the center axis as shown enlarged in FIG. 3(a). This is because the flow should be made a parallel flow as far as possible. since the flow directions of the carrier gas and fine particles jetted out are influenced by the direction of the inner circumferential surface near the flow outlet 1c to a certain extent. However, as shown in FIG. 3(b), by making the angle α of the inside circumferential surface from the throat portion 1b to the flow outlet 1c relative to the center axis 7° or less, and preferably 5° or less, the peel-off phenomenon will hardly occur and the flow of the carrier gas and fine particles jetted out can be maintained substantially uniform, and therefore in this case it is not necessary to form the above mentioned parallel portion. By excluding the process of formation of the parallel portion, the convergent-divergent nozzle 1 can be prepared more easily.

Here, the above mentioned peel-off phenomenon refers to the phenomenon that the boundary layer between the inside surface and the fluid transported in the convergent-divergent nozzle is increased to make the flow non-uniform when there is projection, etc., on the inside surface of the convergent-divergent nozzle 1, which will more readily occur, when the finishing becomes higher in velocity. The angle α as mentioned above should preferably made smaller as the finishing precision of the inside surface of the convergent-divergent nozzle 1 is lower, for prevention of the peel-off phenomenon. The inside surface of the convergent-divergent nozzle 1 should preferably have a finishing precision of three or more, and optimally four or more inverse triangle marks representing the surface finishing precision as determined JIS B 0601. Particularly, since the peel-off phenomenon at the enlarged portion of the convergent-divergent nozzle 1 affects greatly the later flow of carrier gas and fine particles the manufacture of the convergent-divergent nozzle 1 can be facilitated by determining the above finishing precision primarily at the enlarged portion. Also, for preventing generation of the peel-off phenomenon, the throat portion 1b is required to be made a smooth curved surface so that the differential coefficient of the change of cross-sectional area may not become infinite.

The length of the convergent-divergent nozzle 1 can be decided as desired depending on the size of the apparatus etc. In this connection, when the carrier gas and fine particles pass through the convergent-divergent nozzle 1, the heat energy posessed by them is converted to kinetic energy. Since they are particularly jetted out at a supersonic velocity the heat energy may become markedly smaller to make bring them into a supercooled state. When condensing components are contained in the carrier gas, these can be condensed positively by the above supercooled state, thereby forming fine particles. By formation of fine particles according to this procedure, homogeneous fine particles can be also obtained. Also, in this case, for effecting sufficient condensation, the convergent-divergent nozzle 1 should preferably be longer. On the other hand, when condensation as described above occurs, heat energy will be thereby increased to lower velocity energy. Therefore, for maintaining high speed jetting, the convergent-divergent nozzle 1 should preferably be shorter.

To the downstream chamber 4 is connected a pump 5 through an evacuation valve 12 for evacuating the fed carrier gas out of the system. The pressure $P_2$ in the downstream chamber 4 is detected by a pressure gauge 13, and its signal is sent to a controller 2 together with the signal of the pressure $P_n$ at the flow outlet 1c detected by the pressure gauge 11 as described above. The controller 2 controls evacuation of the downstream chamber 4 by opening and closing the evacuation valve 12 from the signals $P_n$ and $P_2$. Within the downstream chamber 4, there is provided a substrate 6 for capturing the fine particles delivered as a beam of flow by the convergent-divergent nozzle 1.

The actuation state of the present apparatus is explained below. First, while the pump 5 is actuated by opening the evacuation valve 12 with setting of a desired set pressure $P_{in}$, the feed valve 7 is opened to feed the fine particles with a carrier gas to the upstream chamber 3.

Figure 4:
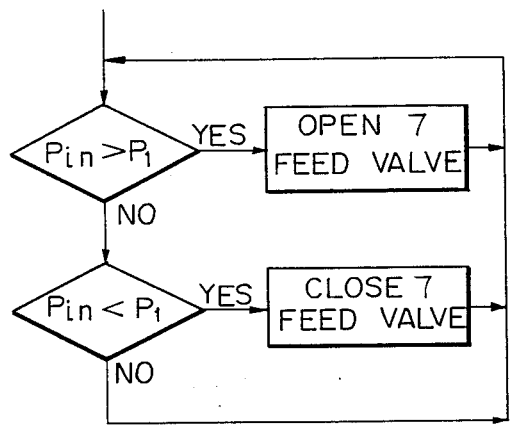
Figure 4:
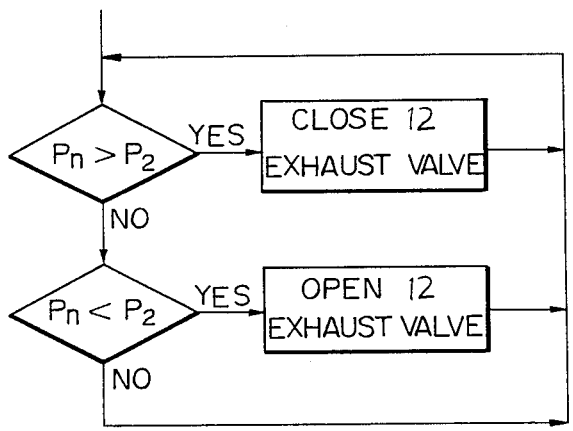

The pressure $P_1$ in the upstream chamber 3 is detected by the pressure gauge 8 and its signal is sent to the controller 9. The controller 9, by comparing the pressure $P_1$ from the pressure gauge 8 with the set pressure $P_{in}$, actuates the feed valve 7 in the open direction when $P_{in} > P_1$, or on the contrary actuates the feed valve 7 in the closed direction when $P_{in} < P_1$ as shown in FIG. 4(a). Accordingly, the pressure $P_1$ in the upstream chamber 3 is maintained at substantially the set pressure $P_{in}$.

On the other hand, the fine particles fed into the upstream chamber 3 pass through the convergent-divergent nozzle 1 together with the carrier gas to flow into the down stream chamber 4. And, particularly when the pressure $P_2$ in the downstream chamber 4 is sufficiently lower than the pressure $P_1$ in the upstream chamber 3 and $P_2/P_1$ becomes lower than the critical pressure ratio, the fine particles and the carrier gas are jetted out from the convergent-divergent nozzle at a supersonic velocity to the downstream 4. The pressure $P_n$ at the flow outlet 1c of the convergent-divergent nozzle 1 is detected by the pressure gauge 11 and the pressure $P_2$ in the downstream chamber 4 by the pressure gauge 13, and the respective signals are sent to the controller 2. The controller 2, by comparing $P_2$ with $P_n$ actuates the evacuation valve 12 toward the closed direction when $P_n > P_2$ or on the contrary actuates the evacuation valve 12 in the open direction when $P_n < P_2$ as shown in FIG. 4(b). Accordingly, the pressures are maintained at substantially $P_n = P_2$, and the flow of the fine particles and the carrier gas jetted out from the convergent-divergent nozzle 1 becomes the optimum expansion flow to be converted to a beam. And, the fine particles delivered as a flow converted to a beam collide against the substrate 6 to be captured thereon, and the carrier gas is successively discharged out of the system through the evacuation valve 12.

Next, the apparatus shown in FIG. 1B is explained.

To the downstream chamber 4 is connected a pump though an evacuation valve 12 for evacuating the fed carrier gas out of the system. The pressure $P_2$ in the downstream chamber 4 is detected by a pressure gauge 13, and its signal is sent to a controller 2 together with the signal of the pressure $P_n$ in the flow outlet 1c detected by the pressure gauge 11 as described above. The controller 2 opens and closes the evacuation valve 12 from the signals $P_n$ and $P_2$ sent and the pressure $P_{out}$ in the downstream chamber 4 previously set in the controller 2, and also controls gas feeding into the upstream chamber 3, namely the feeding of the carrier gas accompanying fine particles by opening and closing of the feed valve 7. Also, in the downstream chamber 4, there is provided a substrate 6 for capturing the fine particles delivered as the flow is converted into a beam by the reducing and enlarging nozzle 1.

First, a desired set pressure $P_{out}$ in the downstream chamber 4 is set in the controller 2, and the fine particles together with the carrier gas are fed into the upstream chamber 3 by opening the feed valve 7 under actuation of the pump 5 by opening the evacuation valve 12. During this operation, the pressure $P_1$ in the upstream chamber 3 can be confirmed by the pressure gauge 8.

On the other hand, the fine particles fed into the upstream chamber 3 flow into the downstream chamber 4 by passing through the convergent-divergent nozzle 1 together with the carrier gas. And, particularly when the pressure $P_2$ in the downstream chamber 4 is sufficiently lower than the pressure $P_1$ in the upstream chamber 3 and $P_2/P_1$ becomes lower than the critical ratio of pressure the fine particles and the carrier gas are jetted out at a supersonic velocity from the convergent-divergent nozzle 1 into the downstream chamber 4.

Figure 5:
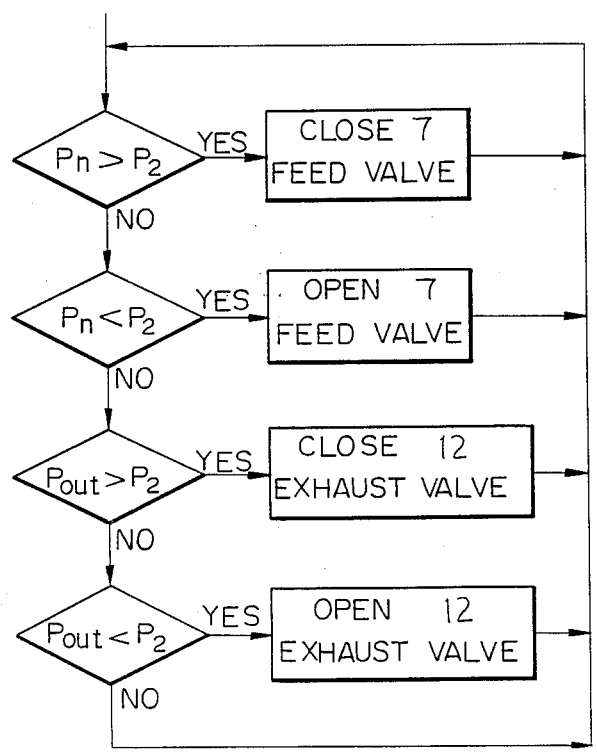

The pressure $P_n$ at the flow outlet 1c of the convergent-divergent nozzle 1 is detected by the pressure gauge 11 and the pressure $P_2$ in the downstream chamber 4 detected by the pressure gauge 13, and the respective signals are delivered to the controller 2. The controller 2, by comparing $P_2$ with $P_n$ actuates the feed valve 7 in the closed direction when $P_n > P_2$ or on the contrary actuates the feed valve 7 toward the open direction when $P_n < P_2$ as shown in FIG. 5. Accordingly, when $P_2$ is too low, the flow amounts of the fine particles and the carrier gas from the convergent-divergent nozzle 1 are increased to elevate $P_2$ or on the contrary when $P_2$ is too high, the flow amounts of the fine particles and the carrier gas from the convergent-divergent nozzle 1 are reduced to lower $P_2$, whereby the pressures are maintained substantially at $P_n = P_2$. By doing so, the fine particles and the carrier gas are jetted out from the convergent-divergent nozzle flow in an optimum expansion flow to be converted into a beam. And the fine particles delivered as the flow converted into a beam are collided against the substrate 6 to be captured thereon, and the carrier gas is successively evacuated out of the system through the evacuation valve 12.

Although the flow can be converted into a beam only by the above actuation, it is preferable to maintain the pressure $P_2$ in the downstream chamber 4 at a constant level in order to effect more stable conversionof the flow into a beam. More specifically, also as shown in FIG. 5, by comparing the actual pressure $P_2$ with the set pressure $P_{out}$ in the downstream chamber 4 previously set, the evacuatiion valve 12 is actuated in the closed direction when $P_{out} > P_2$, or the evacuation valve 12 is actuated in the open direction when $P_{out} < P_2$. By this actuation, $P_2$ is changed to deviate the control of $P_n = P_2$ practiced in the previous stage and therefore again, the control to $P_n = P_2$ is practiced, thus effecting gradual convergence to $P_n = P_2$ and $P_{out} = P_2$.

Embodiments have been discussed for the cases of discharging a gas from the down-stream chamber, and feeding a gas to the upstream chamber by referring to FIGS. 1(a) and 1(b). In another embodiment, such a control means may be employed as controlling simultaneously the gas fed to the upstream chamber and the gas discharged from the downstream chamber.

Having described above about the apparatus according to the Examples of the present invention, the following modifications are possible. First, the convergent-divervent nozzle 1 can be also adapted to vary its direction up and down or right and left to scan at certain intervals. With such modifications, for example, when forming a film by blowing fine particles against the substrate, film formation of a wide range is possible. Particularly, it is advantageous to employ the rectangular nozzle shown in FIG. 2 in combination.

The convergent-divergent nozzle 1 may be also formed of a transparent material so that light having various wavelengths such as UV-ray, IR-ray, laser beam, etc., may be irradiated on the flow. By doing so, the fine particles in the convergent-divergent nozzle 1 can be activated by irradiation of light, and also fine particles can be formed in the convergent-divergent nozzle 1 by feeding the starting gas and the carrier gas into the upstream chamber 3.

By providing a plural number of convergent-divergent nozzles 1, a plural number of beams can be generated at once. Particularly, when a plural number of convergent-divergent nozzle 1 are provided, by connecting them to the upstream chamber 3 independently of each other, different beams of fine particles can be run at the same time, whereby it becomes possible to form new fine particles by collision between the different fine particles according to lamination or by mixed capturing of different particles or by crossing different the beams.

The substrate 6 can be held to be movable up and down or to be right and left or rotatable so as to receive the beam over a wide range. Also, by winding up the substrate in the shape of a roll, and permitting it to receive the beam while delivering the substrate successively, treatment with fine particles can be applied on a lengthy substrate 6. Further, by rotating a drum-shaped substrate 6, treatment with fine particles may be applied.

According to the present invention, the fine particle flow can be endowed with strong beam characteristic and fine particles can be delivered under spatially independent state and at a high velocity. Accordingly, active fine particles can be surely delivered under the state as such to the capturing position, and at the same time it is possible to correctly control its blowing region by controlling the irradiation surface of beam. Also, heat energy is converted to kinetic energy during conversion to a beam, whereby fine particles in the beam enter a frozen state, and therefore it is greatly expected that the present invention will foster a new reaction field. Further, according to the flow controlling apparatus of the present invention, in account of the above frozen state, it is also possible to handle a transition from one state to another state by defining a microscopic state of molecules in the fluid. That is, it is possible to perform a gas phase chemical reaction according to a new system by defining even the various energy levels possessed by the molecules and imparting energies corresponding to these levels. Also, by providing a place for giving and receiving energies different from the prior art, it is also possible to easily produce intermolecular compounds formed with relatively weaker intermolecular forces such as hydrogen bonding or Van der Waals bonding.

What is claimed is:

1. An apparatus for blowing fine particles, on a substrate, comprising:
   a convergent-divergent nozzle having an outlet through which fine particles are blown on the substrate;
   means for sensing pressure at the outlet of said nozzle and pressure downstream from said nozzle; and
   a controller for controlling feeding of a gas to said nozzle and/or discharge of the gas downstream from said nozzle based on a comparison of the pressure at the outlet of said nozzle and the pressure downstream from said nozzle in such a manner that a stable beam of the fine particle flows from said nozzle.

2. The apparatus according to claim 1, wherein said controller controls the pressure upstream from said nozzle to be a set value.

3. The apparatus according to claim 1, further comprising means for forming a static pressure hole in proximity to the outlet of said nozzle.

4. The apparatus according to claim 1, further comprising pressure controlling means for controlling a ratio of the pressures upstream and downstream from said nozzle.

5. An apparatus for collecting fine particles on a substrate, comprising:
   a convergent-divergent nozzle having an outlet through which fine particles are blown to the substrate;
   means for sensing pressure downstream from said nozzle; and
   a controller for controlling feeding of a gas to said nozzle and/or discharge of the gas downstream from said nozzle based on a comparison of the pressure at the outlet of said nozzle and the pressure downstream from said nozzle in such a manner that a stable beam of the fine particle flows from said nozzle and collides against the substrate.

6. The apparatus according to claim 5, further comprising means for forming a static pressure hole in proximity to the outlet of the nozzle.

7. The apparatus according to claim 5, further comprising pressure controlling means for controlling the ratio of the pressures upstream and downstream from said nozzle.

8. The apparatus according to claim 5, wherein said controller controls pressure upstream from said nozzle to be a set value.

9. An apparatus for coating fine particles on a substrate, comprising:
   a convergent-divergent nozzle having an outlet through which fine particles are blown on the substrate;
   means for sensing pressure at the outlet of said nozzle and pressure downstream from said nozzle; and
   a controller for controlling feeding of a gas to said nozzle and/or discharge of the gas downstream from said nozzle based on a comparison of the pressure at the outlet of said nozzle and the pressure downstream from said nozzle in such a manner that a stable beam of the fine particles flows from said nozzle and coats the substrate with the fine particles.

10. The apparatus according to claim 9, wherein said controller controls pressure upstream from said nozzle to be a set value.

11. The apparatus according to claim 9, further comprising means for forming a static pressure hole in proximity to the outlet of said nozzle.

12. The apparatus according to claim 9, further comprising pressure controlling means for controlling the ratio of the pressures upstream and downstream from said nozzle.

* * * * *

UNITED STATES PATENT AND TRADEMARK OFFICE
CERTIFICATE OF CORRECTION

PATENT NO. : 4,875,810
DATED : October 24, 1989
INVENTOR(S) : YUJI CHIBA ET AL.

It is certified that error appears in the above-identified patent and that said Letters Patent is hereby corrected as shown below:

Title page:

[63]
  Related U.S. Application Data, "Oct. 29, 1986," should read --Oct. 20, 1986,--.

COLUMN 2
  Line 12, "through.  Therefore, therethrough" should read --therethrough.  Therefore,--.

COLUMN 4
  Line 34, "into be converted to" should read --to be converted into--.

COLUMN 6
  Line 8, "above mentioned" should read --above-mentioned--.

COLUMN 7
  Line 24, "downstream 4." should read --downstream chamber 4.--.

UNITED STATES PATENT AND TRADEMARK OFFICE
CERTIFICATE OF CORRECTION

PATENT NO. : 4,875,810

DATED : October 24, 1989

INVENTOR(S) : YUJI CHIBA ET AL.

It is certified that error appears in the above-identified patent and that said Letters Patent is hereby corrected as shown below:

COLUMN 9

Line 17, "to be right and left or" should read
--right and left or to be--.

Signed and Sealed this

Fifth Day of March, 1991

Attest:

HARRY F. MANBECK, JR.

Attesting Officer

Commissioner of Patents and Trademarks